(12) United States Patent
Marinovic et al.

(10) Patent No.: US 12,079,578 B2
(45) Date of Patent: Sep. 3, 2024

(54) SYSTEMS AND METHODS FOR AUTOMATIC RESOLUTIONS OF WIRELESS SIGNALS

(71) Applicant: PwC Product Sales LLC, New York, NY (US)

(72) Inventors: Srdjan Marinovic, Washington, DC (US); Eric Stanculescu, Washington, DC (US); Rebecca E. Cohen, Washington, DC (US); Kristopher E. Herring, Washington, DC (US); Anne E. Morrow, Washington, DC (US); Robert T. Rogers, Washington, DC (US)

(73) Assignee: PwC Product Sales LLC, New York, NY (US)

( * ) Notice: Subject to any disclaimer, the term of this patent is extended or adjusted under 35 U.S.C. 154(b) by 681 days.

(21) Appl. No.: 17/269,851

(22) PCT Filed: Sep. 5, 2019

(86) PCT No.: PCT/US2019/049630
§ 371 (c)(1),
(2) Date: Feb. 19, 2021

(87) PCT Pub. No.: WO2020/051265
PCT Pub. Date: Mar. 12, 2020

(65) Prior Publication Data
US 2021/0256222 A1 Aug. 19, 2021

Related U.S. Application Data

(60) Provisional application No. 62/727,871, filed on Sep. 6, 2018.

(51) Int. Cl.
*G06F 40/30* (2020.01)
*G06F 40/166* (2020.01)
(Continued)

(52) U.S. Cl.
CPC ............ *G06F 40/30* (2020.01); *G06F 40/166* (2020.01); *G06F 40/284* (2020.01); *G06N 7/01* (2023.01); *G06N 20/00* (2019.01)

(58) Field of Classification Search
CPC ...... G06F 40/30; G06F 40/166; G06F 40/284; G06N 7/01; G06N 20/00; G06N 5/022;
(Continued)

(56) References Cited

U.S. PATENT DOCUMENTS

| 9,743,436 B1 | 8/2017 | Bradish |
| 2006/0074494 A1 | 4/2006 | McFarland |

(Continued)

FOREIGN PATENT DOCUMENTS

KR 20160149050 A * 12/2016 ........... G06F 17/277

OTHER PUBLICATIONS

Lv, M., Chen, L., Xu, Z., Li, Y., & Chen, G. (2016). The discovery of personally semantic places based on trajectory data mining. Neurocomputing, 173, 1142-1153. (Year: 2016).*

(Continued)

*Primary Examiner* — Douglas Godbold
*Assistant Examiner* — Philip H Lam
(74) *Attorney, Agent, or Firm* — Morrison & Foerster LLP

(57) ABSTRACT

Disclosed herein are embodiments of systems, methods, and products that generate semantic resolutions of wireless signals. An analytic server may train a plurality of inductive classifiers generate a respective set of deduction rules. For example, the analytic server may train a first inductive classifier to mine a first set of deduction rules matching service set identifiers (SSIDs) with business entities. As another example, the analytic server may train a second inductive classifier to mine a second set of deduction rules matching proximal groupings of wireless signals (also (Continued)

referred to as hyperclusters) with business entities. Upon receiving an unresolved wireless signal, the analytic server may apply at least one of the first and second set of deduction rules to assign a semantic meaning to the wireless signal.

20 Claims, 10 Drawing Sheets

(51) Int. Cl.
*G06F 40/284* (2020.01)
*G06N 7/01* (2023.01)
*G06N 20/00* (2019.01)

(58) Field of Classification Search
CPC .......... G06N 20/20; H04W 4/02; H04W 4/80; H04W 4/029
See application file for complete search history.

(56) References Cited

U.S. PATENT DOCUMENTS

| | | | |
|---|---|---|---|
| 2008/0139114 A1 | 6/2008 | Ranganathan | |
| 2010/0234045 A1 | 9/2010 | Karr et al. | |
| 2013/0346347 A1* | 12/2013 | Patterson | H04M 1/72454 706/12 |
| 2014/0274022 A1* | 9/2014 | Bell | H04W 4/50 455/418 |
| 2015/0133162 A1 | 5/2015 | Meredith et al. | |
| 2015/0334678 A1 | 11/2015 | MacGougan et al. | |
| 2016/0004971 A1* | 1/2016 | Verkasalo | G06F 16/29 706/12 |
| 2016/0021494 A1* | 1/2016 | Yang | H04W 4/33 455/41.2 |
| 2016/0078738 A1 | 3/2016 | Basalamah et al. | |
| 2016/0292244 A1* | 10/2016 | Davis Jones | G06F 16/258 |
| 2016/0292581 A1* | 10/2016 | Voit | G06N 5/047 |
| 2018/0184265 A1* | 6/2018 | Wan | H04L 67/303 |
| 2019/0180321 A1* | 6/2019 | Shen | H04L 67/02 |

OTHER PUBLICATIONS

Bettini, C., Brdiczka, O., Henricksen, K., Indulska, J., Nicklas, D., Ranganathan, A., & Riboni, D. (2010). A survey of context modelling and reasoning techniques. Pervasive and mobile computing, 6(2), 161-180. (Year: 2010).*

Basu, P., Bao, J., Dean, M., & Hendler, J. (2014). Preserving quality of information by using semantic relationships. Pervasive and Mobile Computing, 11, 188-202. (Year: 2014).*

Hadjiantonis, A. M., & Pavlou, G. (2009). Policy-Based Self-Management in Wireless Networks. In Context-Aware Computing and Self-Managing Systems (pp. 225-296). Chapman and Hall/CRC. (Year: 2009).*

Extended European Search Report dated May 4, 2022, directed to EP Application No. 19858178.7; 8 pages.

Guo et al. "ShopProfiler: Profiling Shops with Crowdsourcing Data," IEEE Conference on Computer Communications, Apr. 27, 2014; pp. 1240-1248.

International Search Report and Written Opinion issued in International Application No. PCT/US2019/049630 dated Nov. 18, 2019.

Kim et al., "Discovering semantically meaningful places from pervasive RF-beacons," in Proceedings of the 11th international conference on Ubiquitous computing. Oct. 3, 2009, Retrieved on Oct. 26, 2019 from <http://www.eecs.ucf.edu/~lboloni/Teaching/EEL6788_2010/papers/Kim-PlacesRFBeacons.pdf>.

* cited by examiner

SYSTEMS AND METHODS FOR AUTOMATIC RESOLUTIONS OF WIRELESS SIGNALS

This application claims priority to PCT/US2019/049630, filed Sep. 5, 2019, entitled "SYSTEMS AND METHODS FOR AUTOMATIC RESOLUTIONS OF WIRELESS SIGNALS," which claims priority to U.S. Provisional Patent Application No. 62/727,871, filed Sep. 6, 2018, all of which are incorporated by reference in their entirety.

TECHNICAL FIELD

This application relates generally to systems and methods for automatic resolutions of wireless signals, and more specifically assigning semantic meanings to wireless signals.

BACKGROUND

Wireless signals may be represented or identified by a string of numbers and letters that may not have a semantic meaning, such as the names of the entities or the devices generating the wireless signals. For example, wireless signals may be identified by machine access code (MAC) addresses, internet protocol (IP) addresses, and/or service set identifiers (SSIDs), which may be strings with no semantic meaning. Therefore, even if a user's electronic device may receive/sense different wireless signals from a surrounding environment, the user may know little about the environment and about the devices emitting the wireless signals from the string the numbers of letters. The user's electronic device may merely know about the non-semantic identification information of the received wireless signals.

It is technically challenging to resolve the wireless signals by assigning semantic meanings to wireless signals. Assigning the semantic meanings may include determining the kind of a device, business associated with the device, brand, manufacturer, function, and environment in which the device is located, and any other properties of the device associated with the wireless signals. At present, the majority of relationships between wireless signal names (e.g., SSIDs) and business names are resolved through manual labelling. Manual labelling is slow, inefficient, and cumbersome.

Consequently, a significant improvement upon computer-implemented automatic resolution of wireless signals is required.

SUMMARY

What is therefore desired are systems and methods that resolve wireless signals by assigning semantic meanings to those wireless signals. Embodiments disclosed herein provide technical solutions to the aforementioned technical problem and may provide other solutions as well. An analytic server may train a plurality of inductive classifiers to generate a respective set of deduction rules (e.g., probabilistic logic rules and/or modal logic prediction models). For example, the analytic server may train a first inductive classifier to mine a first set of deduction rules matching service set identifiers (SSIDs) with business entities. As another example, the analytic server may train a second inductive classifier to mine a second set of deduction rules matching proximal groupings of wireless signals (also referred to as hyperclusters) with business entities. Upon receiving an unresolved wireless signal, the analytic server may apply at least one of the first and second set of deduction rules to assign a semantic meaning to the wireless signal.

In one embodiment, a computer-implemented method comprises, in a batch processing mode, receiving, by a computer, observation data of a plurality of wireless signals observed by a plurality of observer devices; training, by the computer, a first inductive classifier to generate a first set of deductive rules for syntactic matches between service set identifiers of the plurality of wireless signals and entities associated with the service set identifiers; training, by the computer, a second inductive classifier to generate a second set of deductive rules based on spatial proximity and temporal persistence of the plurality of wireless signals; in a real-time deduction mode: receiving, by the computer, information of an unresolved wireless signal; generating, by the computer, a semantic resolution of the wireless signal based upon applying at least one of the first and second set of deductive rules; and displaying, by the computer, the semantic resolution of the wireless signal on a graphical user interface.

In another embodiment, a system comprises a non-transitory storage medium storing a plurality of computer program instructions; and a processor electrically coupled to the non-transitory storage medium and configured to execute the plurality of computer program instructions to: in a batch processing mode: receive observation data of a plurality of wireless signals observed by a plurality of observer devices; train a first inductive classifier to generate a first set of deductive rules for syntactic matches between service set identifiers of the plurality of wireless signals and entities associated with the service set identifiers; train a second inductive classifier to generate a second set of deductive rules based on spatial proximity and temporal persistence of the plurality of wireless signals; in a real-time deduction mode: receive information of an unresolved wireless signal; generate a semantic resolution of the wireless signal based upon applying at least one of the first and second set of deductive rules; and display the semantic resolution of the wireless signal on a graphical user interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1A:
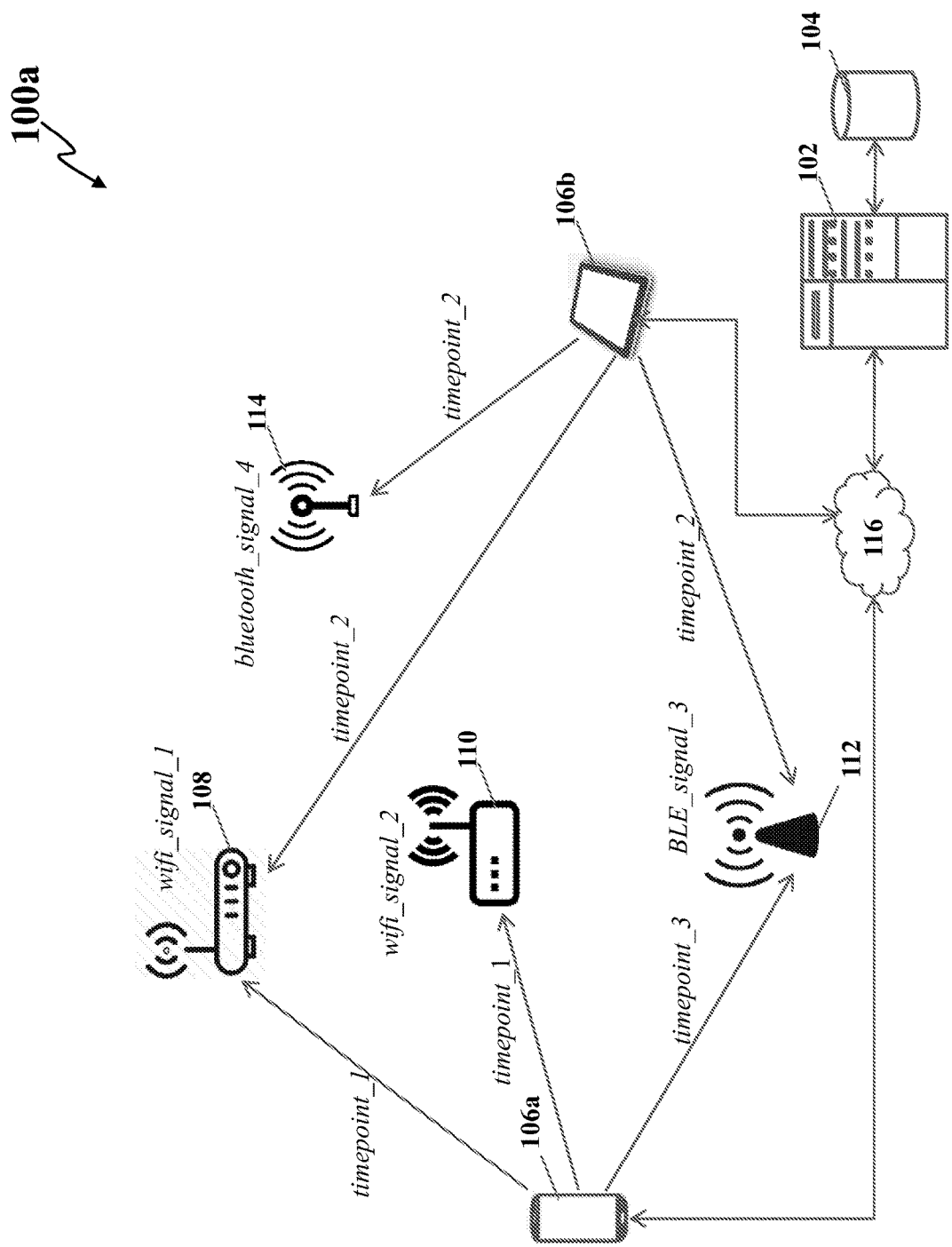
FIGS. 1A-1C show illustrative network environments for automatic resolutions of wireless signals, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods to assign semantic meaning to wireless signals. In an illustrative embodiment, an analytic server may inductively generate a set of deduction rules. The analytic server may then use the set of deduction rules to resolve the wireless signals observed by observer devices. More particularly, the analytic server may generate and train a plurality of inductive classifiers based on the information contained within signals observed by various observer devices. The analytic server may then utilize the inductive classifiers to resolve or classify the incoming signals, e.g., to derive a semantic meaning from the incoming signals.

The analytic server may generate and train service set identifier (SSID) syntactic classifiers based upon the SSIDs in the observed signals. The analytic server may perform a text analysis of the SSIDs to associate the SSID (and consequently the wireless signals) with entities like businesses and manufacturers. For example, the analytic server may associate WiFi signals like "Joe's Free Wifi" and "Joe's Management-Secure" with a business named "Joe's Bar and Grill." These analytic servers may store these associations, generally generated at batch processing of various sets of wireless signals, as deduction rules for real-time time resolutions of wireless signals.

The analytic server may also generate and train a graph structure classifier based upon the spatial proximity and temporal persistence of observed wireless signals. Wireless signals may exhibit different patterns based upon their associations with different business establishment. For example, an observer device at a restaurant may observe wireless signals staying for a couple of hours. In contrast an observer device at a hotel may observe wireless signals arriving at check-in time, staying overnight, and leaving at checkout time. The analytic server may mine these patterns of behaviors of the wireless signals (or proximal groupings thereof) to generate the graph structure classifier.

The analytic server may also generate and train a machine access control (MAC) syntactic classifier based on the MAC addresses of the devices generating the wireless signals. Prefixes of MAC addresses may be sold in bulk to manufacturers and based on these prefixes, the analytic server may identify the manufacturer of the device. For example, Fitbit devices may have a certain MAC prefix and the if the analytic server identifies that wireless signals generated from a group of devices have the same prefix, the analytic server may determine that these wireless signals are coming from Fitbit devices.

It should be understood that the aforementioned classifiers are merely illustrative and the analytic server may generate and train other classifiers to mine different sets of deduction rules for resolving wireless signals. The analytic server may generate and train the classifiers during a batch processing mode, where the analytic server may receive a plurality of wireless signals generated from a plurality of devices. The analytic server may use the deduction rules from the classifiers for a real-time semantic resolution of wireless signals. Furthermore, it should be understood the deduction rules as described throughout this disclosure are not limited to standard probabilistic rules. Other types of deduction rules, such as any standard modal logic prediction models should also be considered to be within the scope of this disclosure.

The analytic server may also distinguish between enterprise and business signals (e.g., router associated with a company or a chain location) and personal signals (e.g., a BLE signal emitted by a person's fitness tracker). In particular, the analytic server may include a trained classifier to classify whether an observed signal is associated with a business entity or a person. Such classification may allow the analytic server to perform operations in a manner that respects individuals' expectation of privacy and complies with privacy rules in different jurisdictions.

FIG. 1A shows components of a network environment 100 for automatic resolutions of wireless signals. The network environment 100 may include an analytic server 102 and a database 104 coupled to the analytic server 102, wherein the analytic server 102 may receive information on wireless signals (or simply signals) detected by one or more observer devices 106 through a network 116 to generate one or more hyperclusters (also referred to as "proximal groupings of electronic devices"). The analytic server 102 may receive identification information about wireless signals detected by the observer devices 106a, 106b and store the identification information in the database 104 for further processing.

The analytic server 102 may function as an interface for an administrator to set configuration settings or provide operational instructions to various components of the network environment 100. The analytic server 102 may be any device comprising a communications component capable of wired or wireless communication with other components of the network environment 100, and a microprocessor configured to transmit and receive certain types of data from the components of the network environment 100. Non-limiting examples of the analytic server 102 may include a desktop computer, a server computer, a laptop computer, a tablet computer, and the like. For ease of explanation, FIG. 1A shows a single computer device functioning as the analytic server 102. However, it should be appreciated that some embodiments may comprise any number of computing devices functioning as the analytic server 102 and capable of performing the various tasks described herein.

The analytic server 102 may be directly or indirectly connected to observer devices 106a, 106b and database 104. Accordingly, the analytic server 102 may be capable of wired or wireless communication through a variety of communication channels with the observer devices 106a, 106b and the database 104 over a network 116. During the wired or wireless communication between the analytic server 102, the observer devices 106a, 106b, and the database 104, each of these devices may be capable to transmitting and receiving data from each other. In some embodiments, each of these devices may normalize and format the data in accordance to pre-stored instructions prior to transmitting the data to other devices. In some embodiments, each of these devices may store a local copy of the data in their memory prior to transmitting original copy of the data to other devices.

Examples of a network 116 may include, but are not limited to, private or public LAN, WLAN, MAN, WAN, and Internet. The network 116 may include both wired and wireless communications channels according to one or more standards and/or via one or more transport mediums. The communication over the network 116 between the components of the network environment 100 may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g., a GSM (Global System for Mobile Communications), CDMA (Code Division Multiple Access), and EDGE (Enhanced Data for Global Evolution) network.

Observer devices 106a, 106b may be any computing and/or telecommunications devices comprising a processor and capable of performing various tasks and processes described herein. Non-limiting examples of the observer devices may include a telephone 106a (e.g., smartphone), a user computer 106b (e.g., desktop, laptop, server, tablet), or any other telecommunications or computing device capable of performing the various tasks and processes described herein. For ease of explanation, FIG. 1A shows two devices functioning as the observer devices 106a, 106b. However, it should be appreciated that some embodiments may comprise any number of observer devices capable of performing the various tasks described herein.

In some embodiments, observer devices 106a, 106b may be computing devices that function as sensor devices, and are directly or indirectly associated with an analytic server 102 and/or a database 104. The sensor devices may be capable of observing signals in their zone of operation emitted by various devices such as IoT devices. The sensor device may further include a sensor processor configured to process the observed signals and extract identification information from the observed signals. Non-limiting examples of the sensor technologies for the sensor devices may include resonant LC sensors, capacitive sensors, and inductive sensors. Based upon the particular type of the sensor waves used and the particular protocols associated with the sensor waves, the sensor devices may observe signals and then generate sensor data, which may include information associated with the observed signals. The sensor processor may receive, interpret, and process sensor data, which the sensor may then provide to a processor of the analytic server 102 and/or the database 104.

Each observer device may include identification information. The identification information may include a name of the observer device, a type of the observer device, a model number of the observer device, a location information of the observer device, and an ID of the observer device where the ID may be pseudo-random identifier such as a hash value. In some cases, each observer device may have multiple IDs and the IDs may change at any time. All past and current identification information of each of the observer device may be stored in a database 104. For example, a given observer device may have an old ID and a new ID, and in such as case, both the old and new IDs may be stored in the database 104. The analytic server 102 may have access to the identification information of each observer device stored in a database 104. The analytic server 102 may generate a query and/or a request and transmit the query and/or the request at any time to the database 104 to receive identification information of any observer device. In some cases, the analytic server 102 on receiving signal data from the observer device may query the database 104 to receive additional identification information regarding the observer device from which it received the signal data.

The analytic server 102 may set configuration settings or provide operational instructions to observer devices 106a, 106b to make observations of signals transmitted by various devices such as Internet of Things (IOT) devices and then provide analytics and data about signal observation application activity back to the analytic server 102. In some embodiments, the analytic server 102 may generate and transmit the operational instructions to the observer devices 106a, 106b at any point of time in order to enable the observer devices 106a, 106b to make the observations of the signals transmitted by various devices such as IoT devices, and then provide analytics and data about signal observation application activity back to the analytic server 102. In some embodiments, the analytic server 102 may generate and transmit the operational instructions to the observer devices 106a, 106b at any point of time in order to disable the observer devices 106 from making any observations of the signals transmitted by various devices such as IoT devices, and then notify the successful disablement of the observer devices 106a, 106b back to the analytic server 102. In some embodiments, the analytic server 102 may also transmit a weblink of configuration settings to the observer devices 106a, 106b, and the observer devices 106a, 106b may use the weblink for installation of the configuration settings in their hardware and/or software. The configuration settings may enable or disable the observer devices 106a, 106b to make the observations of the signals transmitted by various devices such as IoT devices, and then provide analytics and data about signal observation application activity back to the analytic server 102. In some cases, the configuration settings may enable the observer devices 106a, 106b to make the observations of the signals transmitted by various devices such as IoT devices for a limited period of time (such as 2 hours a day) in the day, and the same configuration settings may also disable the observer devices 106a, 106b from making any observations of the signals during the rest of the day. In some cases, the configuration settings may disable the observer devices 106a, 106b from making any observations of the signals when their battery charge is below a predetermined threshold. For this purpose, the configuration settings may allow the analytic server 102 to constantly monitor battery charge of the observer devices 106a, 106b and when the battery charge is below a predetermined threshold, and then the analytic server 102 may disable the observer devices 106a, 106b from making any observations of the signals. In some cases, the configuration settings may disable some applications of the observer devices 106a, 106b when their battery charge is below a predetermined threshold to allow the observer devices 106a, 106b from making observations of the signals. In some embodiments, the configuration settings may instruct the observer devices 106a, 106b to send to the analytic server 102 signals associated with specific types of devices or entities such as signals associated with businesses or other enterprises. The configuration settings may instruct the observer devices 106a, 106b not to send signals associated with individuals' personal devices (e.g., fitness trackers) to the analytic server 102.

The analytic server 102 may receive data including wireless signals detected by observer devices 106a, 106b. In some embodiments, the observer devices 106a, 106b may transmit the data including observed signals to the analytic server 102 as soon as the analytic server 102 detects any signals. In some embodiments, the observer devices 106a, 106b may transmit the observed signals to the analytic server 102 after a predetermined period of time. For example, the observer devices 106a, 106b may be programmed to periodically (e.g., daily) transmit data including all observed signals to the analytic server 102. In some embodiments, the analytic server 102 may fetch data including the observed signals data from the observer devices 106a, 106b periodically (e.g., daily). In some embodiments, the analytic server 102 may fetch data including the observed signals data from the observer devices 106a, 106b based on a triggering condition (e.g., time-based periodic updates, real-time updates). The data may include, but not limited to, all observed wireless signals, a timepoint at which each wireless signal was observed, an approximate latitude coordinates of where event of observation is recorded, an approximate longitude coordinates of where event of observation is recorded, among other data and identification information.

The analytic server 102 may store all the data such as observed wireless signals, a timepoint at which each wireless signal was observed, an approximate latitude coordinates of where event of observation is recorded, and approximate longitude coordinates of where event of observation is recorded in a database 104 for further processing. In some embodiments, the analytic server 102 may store all the data in the database 104 in a format in which all the data was received by the analytic server 102. In some embodiments, the analytic server 102 may first normalize and format all the data, and then store the normalized and formatted version of the data in the database 104. The analytic server 102 may use any suitable normalization and formatting technique to normalize and format all the data depending on content, received format, structure, and size of the data. Upon normalization and formatting of the data, the analytic server 102 may execute algorithms such as clustering algorithms to generate one or more hyperclusters of the signal datasets. Each hypercluster may represent a set of signals that have been observed together by the observer devices 106a, 106b within a number of observations made by the observer devices 106a, 106b. In some cases, for every two observations in the hypercluster, there may exist at least two overlapping observations that contain said two observations.

As illustrated in FIG. 1A, a first observer device 106a may detect, at timepoint_1, wifi_signal_1 generated by a first WiFi router 108 and wifi_signal_2 generated by a second WiFi router 110. A second observer device 106b may detect, at timepoint_2, wifi_signal_1 generated by the first WiFi router 108, bluetooth_signal_4 generated by Bluetooth transmitter 114, BLE_signal_3 generate by a Bluetooth low energy (BLE) transmitter 112. Furthermore, the first observer device 106a may detect, at timepoint_3, the BLE_signal_3 generated by the BLE transmitter 112. Each of the aforementioned signals may include a tuple of (name, MAC address, type). Two signals may be equivalent of all three elements are equivalent.

Each observer device 106a, 106b may transmit through the network 116 information of the detected signals to the analytic server 102 for storage in the database 104 and for further analysis. Based on the temporal persistence and spatial proximity of the signals observed by the observer devices 106a, 106b and received by the analytic server 102, the analytic server 102 may define or more hyperclusters (or proximal groupings of electronic devices) associated with the location where the signals are received from.

The data model employed by the analytic server 102 to identify the hyperclusters may include a set of signals S observed by a population of observer mobile devices U. In the illustrative network environment 100a, S={wifi_signal_1, wifi_signal_2, BLE_signal_3, bluetooth_signal_4} and (={106a, 106b}. As described above, each of the signals in the set of signals S may include a tuple of (name, MAC address, type). The analytic server 102 may identify each observer device 106 with a respective mobile advertising identifier (or any other identifier assigned to or associated with the app or observer device 106), abbreviated as adid. The analytic server 102 may associate each adid of the observer devices 106a, 106b with a matrix of signal and timepoints. More specifically, the analytic server 102 may construct a sparse Boolean matrix to denote which signals an observer adid observed in a given time window. In other words, the Boolean matrix for the observer device 106a, 106b may indicate a presence of (indicated by entry 1) or absence of (indicated by entry 0) one or more signals, as detected by the observer device 106a, 106b for a particular time period. The analytic server 102 may, however, discard signals at stale timepoints as reported by the observer devices 106a, 106b even though the stale timepoints may not indicate a nefarious behavior. For example, if an observer device 106a, 106b has a single observation that stretches credulity (threshold set at more than five days lag), the analytic server 102 may simply remove the observation. In some embodiments, the observer devices 106a, 106b may also transmit the respective latitude longitude coordinates of the observer devices 106a, 106b.

Figure 1B:
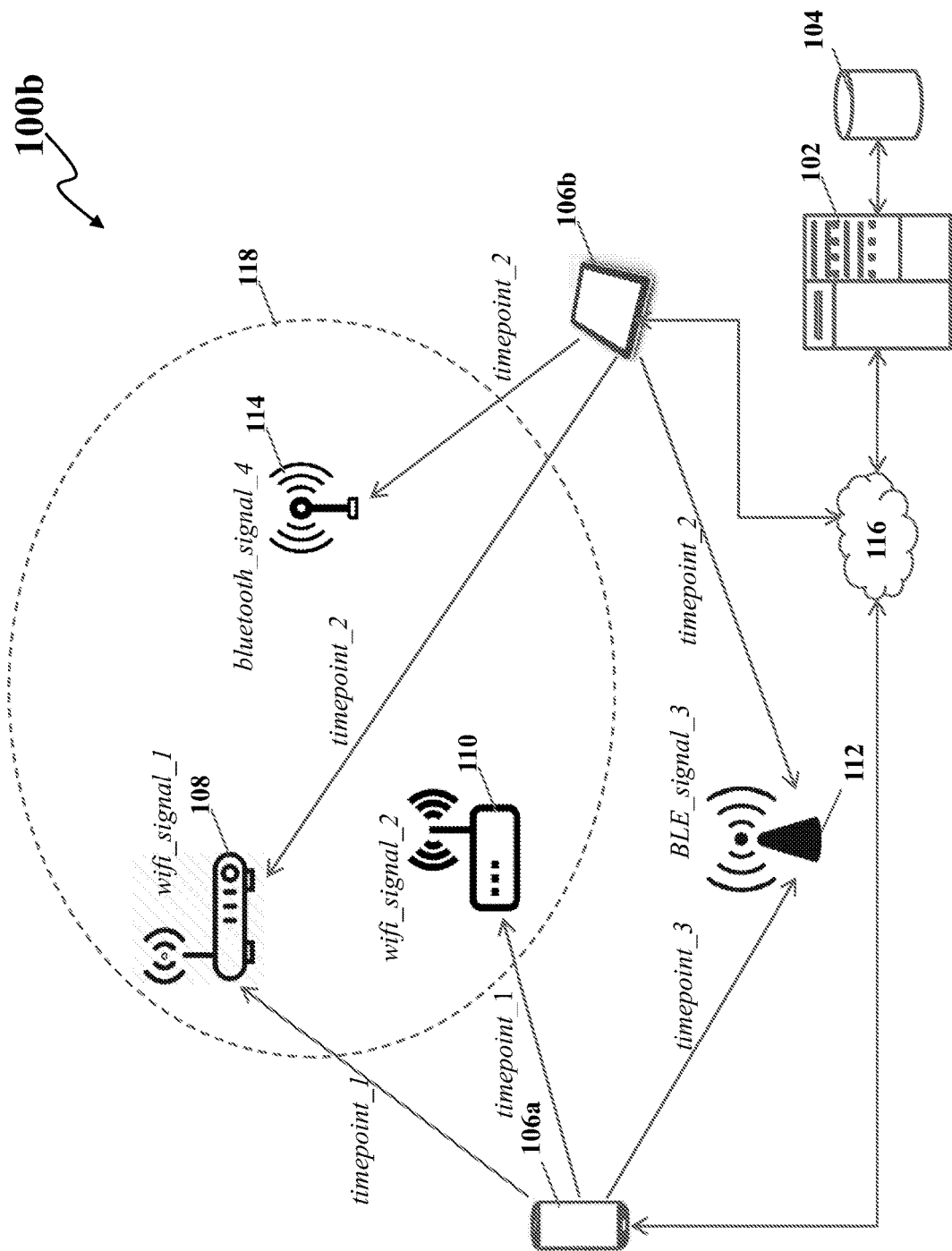

Based on the analysis of the matrices associated with the observer devices 106, the analytic server 102 may generate one or more hyperclusters based on the temporal persistence and spatial proximity of the received signals. FIG. 1B shows a network environment 100b including hypercluster 118 generated by the analytic server 102 based on the wireless signals detected by the observer devices 106. In this illustration, the hypercluster 118 may contain three wireless signals: wifi_signal_1, wifi_signal_2, bluetooth_signal_4. The analytic server 102 may determine the spatial proximity of wifi_signal_1, wifi_signal_2, bluetooth_signal_4 based on the fact that these signals were detected simultaneously or near-simultaneously by each of the observer devices 106a, 106b. The analytic server 102 may determine the temporal persistence of wifi_signal_1, wifi_signal_2, bluetooth_signal_4 based on the fact that the two observer devices 106a, 106b observed these signals at two time points: the first observer device 106a observed these signals at timepoint_1 and the second observer device 106b observed these signals at timepoint_2. However, the analytic server 102 may determine that BLE_signal_3, even though having spatial proximity with wifi_signal_1, wifi_signal_2, bluetooth_signal_4 may not have the requisite temporal persistence. For example, the first observer 106a did not detect BLE_signal_3 at timepoint_1.

The observer devices 106a, 106b may be directly or indirectly connected to the analytic server 102 and a database 104. Accordingly, the observer devices 106a, 106b may be capable of wired or wireless communication through a variety of communication channels with the analytic server 102 and the database 104 over a network 116. During the wired or wireless communication between the observer devices 106a, 106b, the analytic server 102, and the database 104, each of these devices may be capable to transmitting and receiving data from each other. In some embodiments, the observer devices 106 may normalize and format the data in accordance to pre-stored instructions prior to transmitting the data to the analytic server 102 and/or the database 104. In some embodiments, the observer devices 106a, 106b may store a local copy of the data in their memory prior to transmitting original copy of the data to the analytic server 102 and/or the database 104.

The observer device 106a, 106b may be configured to observe an event. The event may contain all signals that the observer device 106a, 106b scan around its zone of operation at a given time point. Accordingly, the event may include observed signal data, and in some cases, the event may also include approximate or correct values of latitude coordinates of where the event is recorded by the observer device 106a, 106b at a given time point. In some cases, the event may further include approximate or correct values of longitude coordinates of where the event is recorded by the observer device 106a, 106b at a given time point.

The event is caused when observer device 106a, 106b observes signals from various devices such as IoT devices. The signals may be an electromagnetic signal emitted by the IoT devices. It is to be noted that the signal may be any type of signal emitted by the IoT devices without moving out the scope of the disclosed embodiments. The signals observed by the observer device 106a, 106b may represent discrete values about the signals. In some embodiments, the discrete values of the signals may be characterized by a type of signal. The type of signal may include, but not limited to, a Bluetooth® signal, wireless fidelity (Wi-Fi) signal, or Bluetooth Low Energy (BLE) signals. In some embodiments, the discrete values of the signals may further be characterized by a name of signal. The name of the signal may be a SSID (service set identifier) that identifies IoT device. The SSID may be a unique ID that consists of 32 characters and is used for naming wireless networks. In some embodiments, the discrete values of the signals may further be characterized by an address of the IoT device through which the device communicates the signal. Each IoT device may emit multiple signals.

Network components may effectuate wired and/or wireless signal communications to and from various devices. The network components may include transmitters, a first WiFi router 108, a second WiFi router 110, and a Bluetooth low energy (BLE) transmitter 112. These network components may be an embedded component of an electronic device; and, in some cases, the network component may be attached to the electronic device through any wired or wireless communications medium. The network components such as the first WiFi router 108, the second WiFi router 110, and the Bluetooth low energy (BLE) transmitter 112 may include electromechanical components (e.g., processor, antenna) that allow the network components to communicate various types of signal data with one or more electronic devices. In some implementations, these signals may represent a distinct channel for hosting communications. The data may be communicated using signals, based on predetermined wired or wireless protocols and associated hardware and software technology. The network components may operate based on any number of communication protocols, such as Bluetooth®, Wireless Fidelity (Wi-Fi), and others.

Databases 104 may be directly or indirectly connected to observer devices 106a, 106b and an analytic server 102. Accordingly, the database 104 may be capable of wired or wireless communication through a variety of communication channels with the observer devices 106a, 106b and the analytic server 102 over a network 116. During the wired or wireless communication between the analytic server 102, the observer devices 106a, 106b, and the database 104, the database 104 is capable of receiving data from the analytic server 102 and the observer devices 106. The data may include, but not limited to, all observed wireless signals, a time point at which each wireless signal was observed by the observer devices 106a, 106b, approximate latitude coordinates of where event of observation is recorded by the observer devices 106a, 106b, approximate longitude coordinates of where event of observation is recorded by the observer devices 106a, 106b, among other data and identification information. For ease of explanation, FIG. 1A shows a single database 104. However, it should be appreciated that some embodiments may comprise any number of databases capable of performing the various tasks described herein.

The database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 102 and the observer devices 106a, 106b. In some embodiments, a memory of the databases 104 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the databases 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In operation the analytic server 102 may utilize the hypercluster 118 (or proximal grouping of wireless devices 108, 110, 114) to generate a semantic to one or more wireless signals. For example, if the hypercluster 118 is observed by multiple devices throughout the day and not observed by any device during the night, the analytic server 102 may determine that the hypercluster 108 may be within an office and the devices 108, 110, 114 may be installed in an office. If the hypercluster 118 is persistently observed by a few devices, the analytic server 102 may determine that the hypercluster 108 may be within a home and the devices 108, 110, 114 may be installed in a home. The analytic server 102 may also distinguish between enterprise and business signals (e.g., router associated with a company or a chain location) and personal signals (e.g., a BLE signal emitted by a person's fitness tracker). In particular, the analytic server 102 may include a trained classifier to classify whether an observed signal is associated with a business entity or a person. Such classification may allow the analytic server 102 to perform operations in a manner that respects individuals' expectation of privacy and complies with privacy rules in different jurisdictions.

Figure 1C:
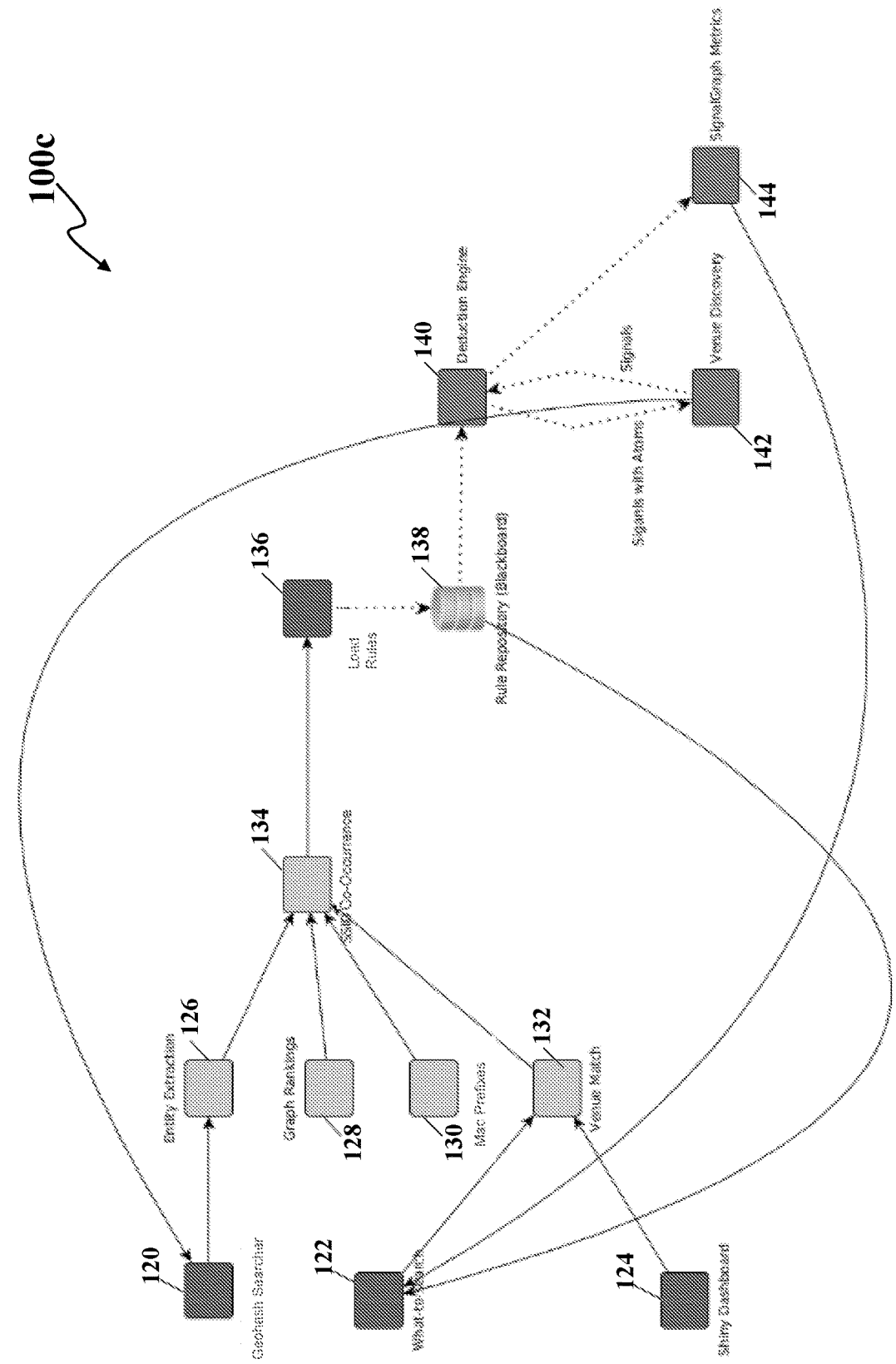

FIG. 1C shows an illustrative architecture diagram 100c of a system of automatic resolution of wireless signals, according to an illustrative embodiment. The components shown in the architecture diagram 100c may be hardware modules, software modules, or a combination of hardware and software modules. It should also be understood that the components shown in the architecture diagram 100c are merely illustrative and additional, alternate, and a fewer number of components should be considered within the scope of this disclosure.

A Geohash Searcher component 120 may take inputs such as a geohash or a latitude/longitude pair to query a map database to retrieve entities (e.g., businesses) at locations of the input geohash or the latitude/longitude pair. For example, a Venue Discovery component 142 may discover or identify a venue based on a signal atom received from a Deduction Engine component 140 and provide the information of the venue to the Geohash Searcher component 120. The Geohash searcher component 120 may then use the information of the venue to retrieve a geohash or the latitude/longitude to query the map database. The Geohash Searcher component 126 may provide the search results to an Entity Extraction component 126 which may maintain records of entities associated with the geohash or the latitude/longitude pair.

A What-to-search component 122 may receive inputs from a Rule Repository component 138 and/or a Signal-Graph metrics component 144. The What-to-Search component 122 may determine, based on pre-configured weights, which types of entities (e.g., businesses) to search for. Therefore, the What-to-Search component 122 may allow the system to focus computational resources on particular types of businesses (e.g., hotels). Based on the types of businesses determined by What-to-Search component 122, a Venue Match component 132 may find candidate signals and may attempt to classify the candidate signals. In other words, the Venue Match component 132 may be an inductive classifier whereas the What-to-Search component 122 may provide a configuration to the Venue Match component 132. A Shiny Dashboard component 124 may provide an administrative interface to manage the system of automatic resolution of wireless signals. A Graph Rankings component 128 may mine for resolution rules based on the existence of hyperclusters (or proximal groupings of electronic devices). A Mac Prefixes component 130 may mine resolution rules based upon the machine access control (MAC) addresses. An SSID Co-occurrence component 134 may aggregate the rules mined by the components 126-132. A Load Rules component 136 may store the deduction rules generated by the SSID Co-Occurrence component 134 to the Rule Repository component 138. A Deduction Engine component 140 may retrieve the deduction rules from the Rule Repository component 138 to assign atoms to signals received from a Venue Discovery component 142. The Deduction Engine component 140 may further provide updates to the SignalGraph Metrics component 144.

Figure 2:
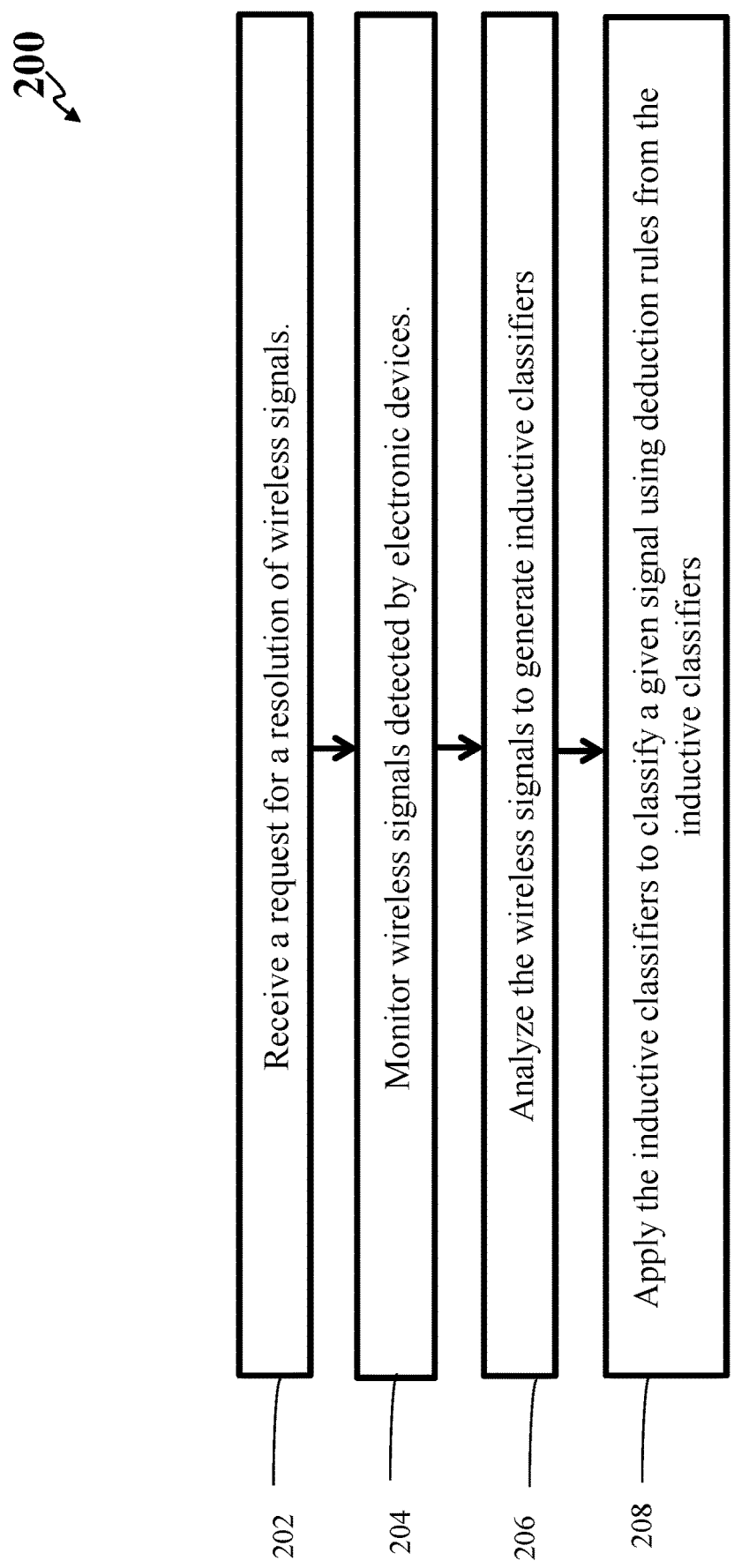
FIG. 2 shows an illustrative flow diagram for automatic resolutions of wireless signals, according to an embodiment.

FIG. 2 shows a flow diagram 200 of a method for automatic semantic resolution of wireless signals, according to an illustrative embodiment. Other embodiments may comprise additional or alternative steps, or may omit some steps altogether. Although multiple computing systems and databases can implement one or more steps of the method, this description details, for brevity, an analytic server implementing the various steps of the method.

At step 202, the analytic server may receive a request for a resolution of wireless signals. The analytic server may receive the request from a computing device, such as a server, associated with a client entity. The request may have one or more parameters such as a parameter indicating a geographical area of which wireless signals have to be resolved. The analytic server may receive the request from any form of wired of wireless communication.

At step 204, the analytic server may monitor wireless signals detected by a plurality of observer devices which may be electronic devices configured for detecting and receiving wireless signals. The analytic server may collect the wireless signals detected by the observer devices at different time points periodically. For example, the analytic server may query the detected wireless signals from the observer devices every five minutes. The analytic server may monitor the observer devices for a predetermined time window (e.g., a sliding window). For example, the analytic server may monitor the observer devices for seven days or three months. In some embodiments, the analytic server may perform batch processing to continuously train one or more inductive classifiers without an explicit request for semantic resolutions. Thus, the analytic server may continuously generate sets of deduction rules to be used for a real-time resolution of the wireless signals.

In other words, the analytic server may monitor a given population of observer devices. Each observer device may report the detected signals to the analytic server. Let S denote a set of signals observed by the given population of observer devices. As described above, a signal s may be a tuple (name, MAC address, type). The analytic server may consider two signals to be equivalent if all three elements for the two signals are equivalent. Each observer device may be identified with a mobile advertising identifier, sometimes abbreviated as adid. Different adids may represent different observer devices. Each adid may be associated with a matrix of signals and time points. Each row is a signal in S, while time points T are of minute precision, and may be closed by a given time window for the analysis. The analytic server may construct a sparse Boolean matrix, $U \rightarrow Bool^{S \times T}$ to store which signals the mobile adid u observed in the given time window. If an observer device observed a signal s at time t, the analytic server may set the corresponding element in the matrix to 1; otherwise, set the element to 0.

In some embodiments, electronic devices report time points that may become stale over a few days. Regardless of whether this is indicative of nefarious behavior, doing time-dependent signal analysis on an observer device's (e.g., the mobile phone's) signal observations may be difficult for the analytic server if their times are overly stale. If an observer device had a signal observation that stretches credulity (the threshold set at more than five days lag), the analytic server may remove that observation (e.g., the detected wireless signals). In some embodiments, the analytic server may remove from consideration an observer device (e.g., mobile device) with two or more incredible time points.

At step 206, the analytic server may analyze the wireless signals collected at different time points from different observer devices to generate inductive classifiers. An inductive classifier may produce a mapping from a signal and observation to atoms (e.g., syntactic and/or semantic meanings). In other words, given a signal and its history, the inductive classifier may create a mapping that describes how signals with similar patterns should be classified in terms of businesses, manufactures, and/or other syntactic and/or semantic information. The inductive classifiers may therefore generate deduction rules or resolution rules forming a knowledge base for mappings from wireless signals to syntactic and/or semantic meanings.

For a given signal within a given observation, an atom may be a constant that defines some intrinsic property of the signal within the observation. A resolution may be a function that for a given signal s within a given observation o, assigns an atom a to s. The analytic server may link atoms and signals via a first-order relationship defined as: S×O×Atoms→Bool. For example, in a resolution (s, o, phone), atom phone may indicate the signal s is emitted by a smartphone device. Similarly, another resolution (s, o, restaurant) may indicate that s is emitted by routers that are located within a restaurant; and yet another resolution (s, o, burger king) may indicate that s is emitted by routers that are located within a Burger King. The analytic server may therefore parametrize the resolution process by a knowledge base K containing a plurality of deduction rules (classifiers) that derive the relationships between signals and atoms, such as the resolutions described above.

The analytic server may use a knowledge base K defined as a set of First-Order logic rules to make probabilistic inferences over relationships. Formally, the resolution may be represented by Horn-rule:

($\forall$s·$\forall$o) is (s,o,atom$_k$)←hasSyntax(pattern$_i$,s), cons$_0$(s,o), . . . , cons$_i$(s,o)

The relationship hasSyntax denotes whether a signal s satisfies some syntactic or semantic relationship with a given pattern. It may be over its name or its address. Cons relationships may be restrictions on the properties of a given observation.

The analytic server may assign atom to signal sig if K⊨ is (sig, obs, atom), where ⊨ may be a first order logic (FOL) inference. In some embodiments, the analytic server may extend the deduction language with hasSemantics relationship that will facilitate assignment of atoms based on semantic graph-properties that exhibited by a signal.

The analytic server may extend the first order logic #relationship using edit string distance. In particular, a Horn clause may be represented as:

<p> is (s,o,a)←hasSyntaxPrefix(pattern,s,p), . . .
<p> is (s,o,a)←hasSyntaxSuffix (pattern,s,p), . . .

where hasSyntaxPrefix may be satisfied if pattern is a prefix of a given signal name, and hasSyntaxSuffix may be satisfied if a pattern is a suffix of the signal name. Variable p is then the edit distance between the name and the pattern. Finally, ⊨ may be an argmax over all satisfied rules. The analytic server may implement the deductive system using a Tries data structure, where each rule's pattern may be encoded as the key, while the atom assignment may be the corresponding value.

To generate a knowledge base K of deduction rules, the analytic server may generate and train a plurality of inductive classifiers. Three illustrative inductive classifiers: an SSID classifier, a MAC classifier, and graph structure classifier (also referred to as network classifier) are detailed below.

Figure 3:
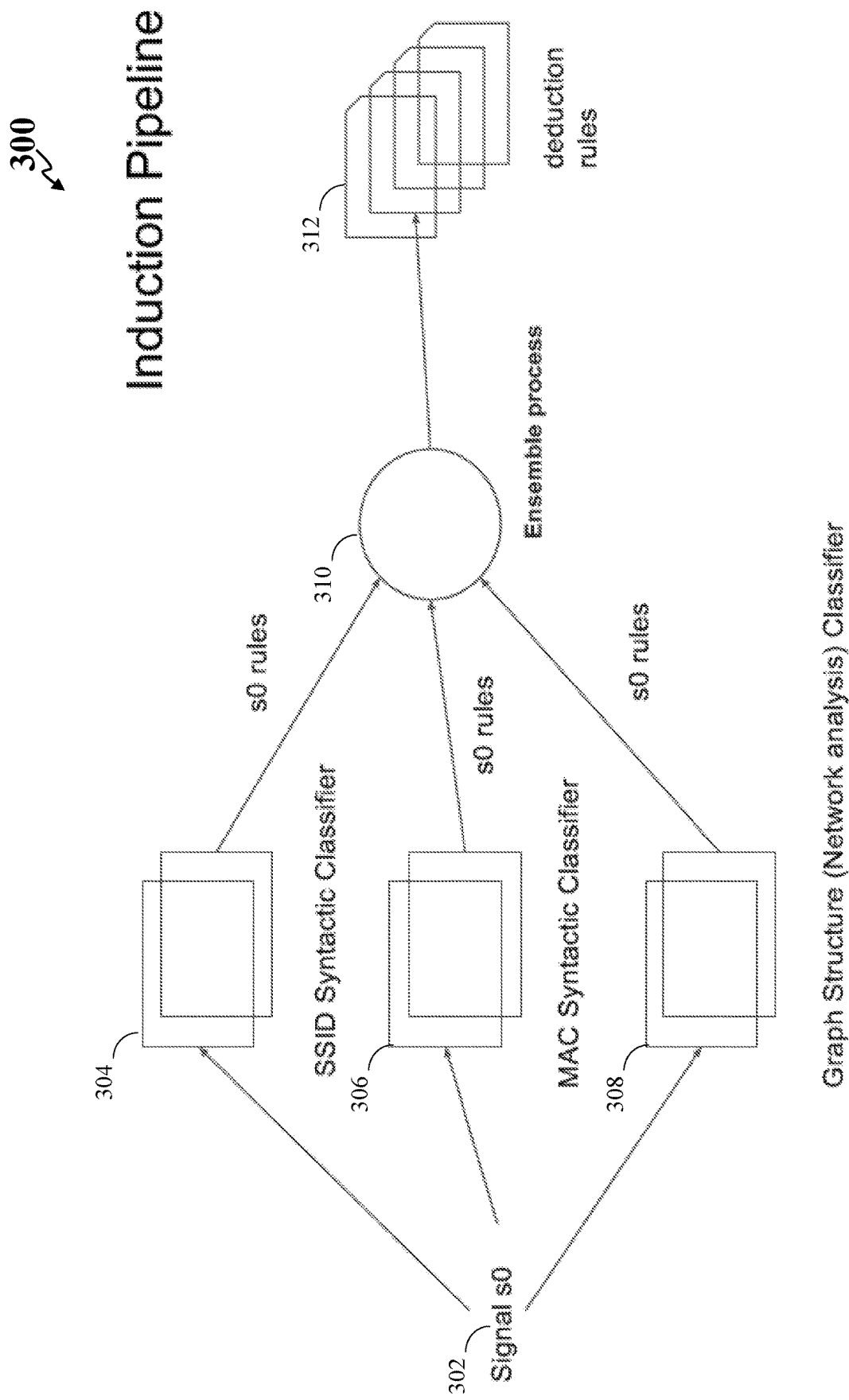
FIG. 3 shows an illustrative induction pipeline, according to an embodiment.

FIG. 3 illustrates an illustrative induction pipeline 300 implemented by an analytic server, according to an embodiment. The analytic server may receive information of a plurality of wireless signals observed by a plurality of observer devices. An illustrative wireless signal is shown as 302. In some embodiments, the analytic server may generate a service set identifier (SSID) classifier 304 by probabilistically assigning one or more atoms to the signal 302 based on the SSID of the signal 302. The SSID classifier 304 may therefore generate a set of deduction rules based upon an observed pairing between the signal 302 and its SSID. In other words, the SSID classifier 304 may determine a mapping of an SSID of the given signal 302 to a business name. For example, if the signal 302 is a WiFi signal with an SSID "Joe's Free WiFi," the SSID classifier 304 may determine that such a signal is from a business called "Joe's Bar and Grill." It should be understood that the SSID classifier 304 may be a syntactic or a semantic classifier.

In some embodiments, the analytic server, to generate the SSID classifier 304 may determine SSID-business match function. In other words, given a SSID and a set of business names, the analytic server may identify correct SSID-business pairing.

The analytic server may first remove stop words from SSIDs. The stop words may be several words and phrases that may occur frequently in SSIDs, and in the names of the businesses. These words may generally not be a unique identifier of the business and may serve as a distraction that may lower the potential degree of overlap between an SSID and a business that may be closely related.

For example, there may be a business called "Joe's Bar and Grill." Joe's Bar and Grill may have two WiFi signals with SSIDs "Joe's Free WiFi" and "Joe's Management— Secure." Here, although the full name of the restaurant is "Joe's Bar and Grill," the word "Joe's" may be the most significant word in each of SSIDs describing the business identity. "Bar and Grill" may be merely a description of the business, while "Free WiFi" and "Management—Secure" may be descriptions of the respective WiFi networks.

There may be ways to use context clues to determine which phonemes in particular words are the most important, but in this embodiment, the analytic server may avoid common distractions may be by filtering out a set of stop words that are unlikely to describe the business's core identity. There may be three different types of stop words that may be useful to the analytic server: general WiFi stop words, business type stop words, local stop words.

General WiFi stop words may turn up frequently in WiFi signals and tend to describe properties of the signal or network. In the example above, "free," "WiFi," "management," and "secure" may be non-limiting examples of WiFi stop words. Some words included in the WiFi stop word list may be the names of common hotspots or providers, for instance, "xfinitywifi" may be the SSID of a provider's wireless hotspots. This may be more accurately understood as a distinct resolution, rather than a stop word, but from a pragmatic standpoint, it may be more efficient to for the analytic server to filter out these common resolutions and leave an empty string rather than attempt to resolve signals from known resolution dictionary prior to attempting to mine new relationships. Business-type stop (e.g., "shop," "store," and "hotel") words may turn up in both wireless signals and business names. Such words may be useful in establishing the relationship between a signal and a business, but may be insufficient to demonstrate a connection unless there are additional tokens in common.

Unlike the two categories of stop words described above, local stop words may not be a static dataset and may have to be derived online for a specific location prior to analytic server attempts to mine resolutions. Local stop words may be useful for identifying different locations of chain businesses. Such words may have the name of the city or neighborhood at the end of their SSIDs. For example, if Joe's Bar and Grill were a chain, there may be "Joe's Denver," "Joe's Downtown," and/or "Joe's Union Station." However, there may times when local stop words may be part of the name of a business. For example, there is a chain of bagel shops in the Washington, DC area called "Bethesda Bagels." The first location was in Bethesda, Maryland, and then they spread to other places around the city. By filtering local stop words, the analytic server may risk missing the flagship location while correctly identifying other locations. As with the business types, a local stop word may be an important part of the business's name, and may not be ignored by the analytic server. Yet, the local stop word may sometimes be insufficient evidence for establishing a relationship between two signals.

The general stop words filtered out by the analytic server may include: "passpoint", "twcwi", "twc", "att", "verizonwi access", "free", "freewi", "office", "ipad", "iphone", "phone", "apple", "xfinitywi", "linksys", "wireless", "wifi", "wi", "fi", "public", "private", "guest", "2g", "5g", "g", "ghz", "hz", "2", "4", "5", "network", "null", "wlan", "visitor", "corporate", "direct", "internal", "secure", "express", "staff", "employee", "internet", "xfiinity", "centurylink", "netgear", "ssid", "voip", "nan", "home", "the", "corp", "management", "and" "family", and "super". The business types stop words filtered out by the analytic server may include: "hotel", "restaurant", "cafe", "pizza", "stadium", "arena", "resort", "market", "college", "university", "deli", "gourmet", and "bar".

The analytic server may use the name of the town or city and any neighborhoods in the vicinity of the point where a signal was observed to produce local stop words. The analytic server may get city and town names by querying Google Map's reverse geocoding API (application programming interface). Identifying neighborhoods may be more challenging as many neighborhoods may be informal, may have ill-defined boundaries, may often overlap, and may have multiple abbreviation or nicknames. If the analytic server is unable to get a comprehensive list of neighborhoods within a certain radius of a given point, the analytic server may identify some neighborhoods by querying the Google Maps reverse geocoding API. Because neighborhood boundaries may be complex, the analytic server may derive the results by taking a uniform random sample of points within a circle and aggregating all results.

As described above, the analytic server may take in a set of SSIDs and a set of business names and return a list of potential matches between the SSIDs and the businesses. Rather than performing pairwise comparisons between every specific SSID and every business name, the analytic server may take the names and compress or reduce them in different ways. The analytic server may store two dictionaries: compressed SSIDs and compressed business names. For each of the SSIDs and business names, the analytic server may apply one or more compression functions and save each compressed version as a key pointing back to the original SSIDs and business names. Once the analytic server has compressed the SSIDs and the business names, the analytic server may compare the compressed SSIDs with compressed business names, find any keys shared in common, and look up the original names. This approach has the advantage over pairwise comparison that it has linear runtime relative to the number of names submitted, rather than a polynomial runtime. Furthermore, it may also be easy to add or remove compression functions as the analytic server searches for specific patterns in the data.

The first step in finding matches between SSIDs and business names may be to identify exact matches. For example, "Joe's Bar and Grill" may have a WiFi with SSID "Joe's Bar and Grill."

In some embodiments, there may not be exact matches, and the analytic server may have to tokenize SSIDs (e.g., the remaining words in the SSIDs after the stop words have been removed) and generate tokenized SSIDs for further processing. Business names from external sources tend to follow a conventional pattern of words divided by spaces. Some SSIDs may follow this pattern as well, but many use other separators, such as dash or underscore punctuation marks. One of the most common separators for WiFi names is the use of capital letters at the start of words, such as "WeWorkGuest."

The analytic server may tokenize the business names and SSIDs by splitting anywhere with a space, dash, underscore. If a capital letter follows a lower-case letter, the analytic server may split after the lower-case letter, allowing the capital to start the new word. If a lower-case letter follows a capital letter, the analytic server may split before the capital letter, once again allowing the capital letter to start the word. However, as all capitals may be common in SSIDs, the analytic server may not split words between capital letters unless a capital is followed by a lower-case.

The analytic server may use the same tokenization algorithm for businesses and SSIDs, although certain patterns are more common in SSIDs. Because there may be occasional businesses whose official names are in camel case (such as WeWork and MakeOffices), the analytic server may tokenize such business names in a consistent manner with the SSIDs in order to reduce to the same standardized forms. The analytic server may also remove any substring containing four or more characters of hexadecimal. This may be important because many automatically generated SSIDs will contain long strings of hexadecimal. These strings may produce false positive matches with other strings.

The analytic server may also perform standard compression taking the tokenized name, converting to lower-case, removing any tokens that are stop words, and rejoining remaining tokens in the original order. The analytic server may perform standard compression multiple times using an increasing broad set of stop words: the analytic server may first remove general WiFi stop words only, then local stop words and finally words indicating business types.

The analytic server may also perform a string prefix function, which may return all prefixes of a name that have above the minimum prefix length (e.g., satisfy the minimum prefix length). The analytic server may adjust, by default, the string prefixes if the string is composed of multiple tokens, and the shortest prefix may be set to be the maximum of the length of the shortest token or four. This means a multi-token string may not be mismatched based on the first few letters of the first word, and a string with very short first token may still require a few more characters to induce a greater specificity.

Using string prefixes may have a distinct advantage over using only prefixes of tokens. On strings that have only one token, prefixes may begin with the default token length of four. This may be important for SSIDs, which may be all lowercase and may lack spacing or punctuation between words. For example, using the string prefix function, the analytic server may match "villageclub" as the SSID for "Village Club of Sands Points." Prior to computing the string prefixes, the analytic server may remove white space and stop words from the beginning of string. This may insure that not all businesses that begin with "hotel" or "restaurant" or "New York" will be identified as the same thing. After computing each token prefix, the analytic server may check that the prefix is not a stop word prior to saving. It may be important to use all prefixes rather than just the shortest. If two names share the first ten letters, they will share the first nine letters, and the first eight, so this computation may appear redundant. However, one of these longer prefixed may be an exact match with a full SSID, or one that has been reduced with some other form of compression.

By default, the analytic server may not save token prefixes because they are a strict subset of string prefixes. However, if string prefixes are set to false, token prefixes can be a desired option. Compared to string prefixes, token prefixes may have a higher precision at the cost of lower recall. Thus, token prefixes may fail to identify certain correct relationships that string prefixes will catch, but they will also be much less likely to produce false positives.

If enabled, token prefixes will require a default of two or more tokens. The analytic server may take the first two tokens as a prefix, then the first three, and so on, until the analytic server has every prefix shorter than the total number of tokens. The analytic server may take the token prefixes, convert them to lower-case, and join them, without removing stop words. The analytic server may also check to make sure that the full token prefix is not in the list of stop words. As with string prefixes, it is important to save all tokens prefixes, not merely the shortest; otherwise, the analytic server may miss the opportunity to match longer prefixes with results of other algorithms.

The analytic server may also compare initials of the SSIDs and the business names. Comparing initials may help to identify matches that do not share prefixes or ngrams. Many businesses, essentially those with long names, may use their initials as a nickname, and many SSIDs include the initials of the company that owns them. For example, some WeWork locations have "ww-members" and "ww-guest" as their SSIDs. The initials algorithm may tokenize the name and concatenate the first character of each token. Once again, stop words may interfere when trying to extract the proper initials. Some stop words may be part of an acronym, while others may not be excluded. Thus, the analytic server may produce up to four different sets of initials, by filtering out general stop words, then local stop words, then business types, then all of the above.

There may also be a tradeoff in terms of the number of tokens necessary to produce meaningful initials. If there is a single token, that one initial may be insufficient to make a match. Lowering the number of tokens needed from 3 to 2 may introduce 3 new true positives and 154 new false positives. Thus, the analytic server may set the default number of tokens to three. However, in case where there will be heavy manual oversight or additional automated checks on top of the initials (for example, using underlying graph structure), the analytic server may set the number of tokens to two rather than three.

The analytic server may also compute token ngrams. Based on the signals that have been resolved, it can be seen that there is a strong pattern that matches are most likely to occur at the beginning of a string, while divergence becomes more frequent toward the end. Thus, caching and comparing the large numbers of prefixes may be desired. However, if the analytic server focuses exclusively on prefixes, the analytic server may miss cases where the beginning is not an exact match. For instance, if a business name begins with "The" and the SSID does not have it. If this is the only difference, then standard compression would remove the "The" as a stop word and identify an exact match. However, if there is another differing token later in the name, the analytic server may fail to identify the match.

To solve such a problem, the analytic server may apply ngram. Computing token ngram is a way to find matches where beginning is off but the bulk of the names match. The analytic server may compute ngrams of between two and four tokens in length. As with the prefixes, the analytic server may keep stop words that may be part of the ngram but if the full ngram is a stop word, the analytic server may exclude the stop word.

Ngrams of strings are the basis of the resolution architecture. Strings are broken into ngrams of between 3 and 6 characters. In order for a match to be established, a sufficient fraction of ngrams must be shared between an SSID and a business name. String ngram comparisons introduce large numbers of false positive results, depending on the exact length and number of ngrams being used. The analytic server may determine the optimal lengths and thresholds and compare different approaches to processing stop words.

The analytic server may use a relatively lax ngram model designed to tolerate high false positive rate in order to get more true matches. The analytic server may identify as a match any pair that shared at least four ngrams of length three to five. This means that any two strings that share a six-character subsequence are identified as a match, or any two with a five-character subsequence and a three-character subsequence in common, or two four-character subsequences. The analytic server may not filter any stop words.

With the implemented steps including exact match, standard compression, string prefix, token prefix, initials and token ngrams, the analytic server may be able to identify more true positive results than a relatively generous ngram model which identifies as a match any pair that shared at least four ngrams of length three to six.

The analytic server may generate and train the machine access code (MAC) classifier 306 by probabilistically assigning atoms to the observed signal 302 based on the MAC address of the signal 302 to generate another set of deduction rules. The MAC classifier 306 may map the manufacturer of the device emitting the signal 302 based on the organizationally unique identifier (OUI) of the MAC address. For example, the MAC classifier 306 may determine that the signal 302 with OUI a4:77:33 is from a Google device.

The analytic server may train the graph structure classifier 308 (also referred to as a network analysis classifier) to assign atoms to the signal 302 based on a network graph of the signal 302, such as a hypercluster of the signal 302. In other words, the graph structure classifier 308 may consider the spatial proximity and temporal persistence of one or more signals around the signal 302 to determine the atoms and generate yet another set of deductive rules. For example, the signal 302, if from a hotel may be observed by many different devices, while if from a home may be only observed by limited number of devices. In other words, graph structure classifier 308 may mine a set of deduction rules based on the proximal groupings of the wireless signals.

The analytic server may execute an ensemble process 302 ensemble the different rules of SSID syntactic classifier 304, MAC syntactic classifier 306, graph structure classifier 308 in an ensemble process 310 to produce an aggregated set of deduction rules 312 from the aforementioned sets of deduction rules. Furthermore, it should be understood the deduction rules 312 and as described throughout this disclosure are not limited to standard probabilistic rules. Other types of deduction rules 312, such as any standard modal logic prediction models should also be considered to be within the scope of this disclosure.

At step 208, the analytic server may use a deduction engine (also referred to as a deduction agent) to classify a given signal by applying the deduction rules. Deduction rules may assign to the given signal pattern within some observation pattern related atoms. To apply deduction rules to a signal, the analytic server may have to extract information from the signal, such as, SSID, MAC prefix. The analytic server may use the deduction engine for a real time resolution of the given wireless signal.

Figure 4:
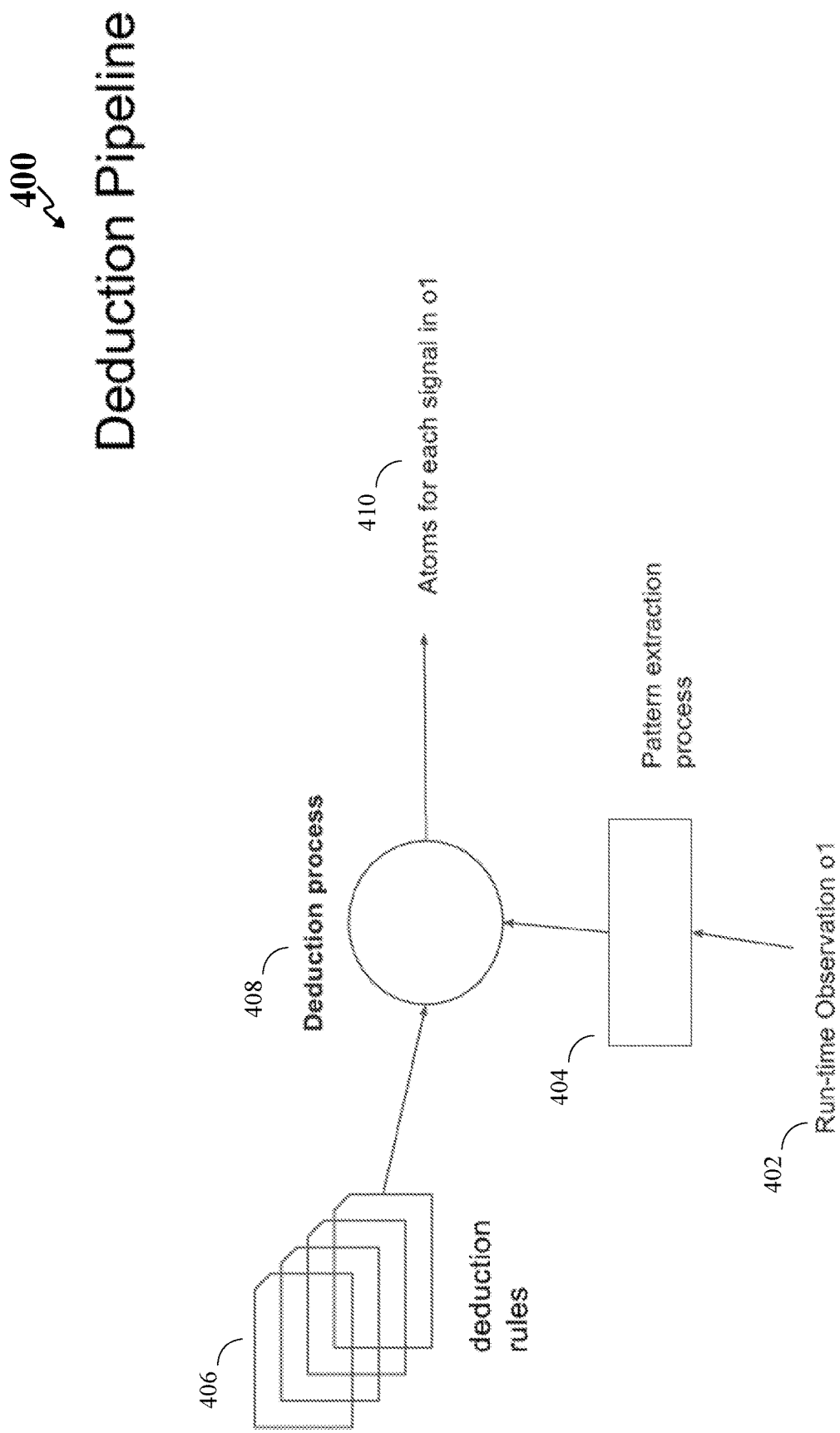
FIG. 4 shows an illustrative deduction pipeline, according to an embodiment.

FIG. 4 illustrates an illustrative deduction pipeline 400, according to an embodiment. The analytic server may receive a run-time observation 402 from an observer device. The run-time observation 402 may comprise one or more wireless signals sensed/observed by the observer device. The analytic server may execute a pattern extraction process 404 to obtain the SSID, OUI of MAC address, and/or the graph structure associated with the signals. The analytic server may execute a deduction process 408 to apply deduction rules 406 to determine atoms 410 for the one or more wireless signals in the run-time observation 402.

Illustrative Network Resolution

The goal of a network resolution may be to input an organizationally unique identifier (OUI) and return a probability vector for different resolutions. The probability vector may include corresponding likelihoods that one or more entities are associated with a wireless signal. An organizationally unique identifier (OUI) is a 24-bit number that uniquely identifies a vendor, manufacturer, or other organization. OUIs may be used as a first portion of derivative identifiers to uniquely identify a particular piece of equipment as MAC addresses. In MAC addresses, the OUI is combined with a 24-bit number (assigned by the owner or 'assignee' of the OUI) to form the address. The first three octets of the address are the OUI.

For example, given the OUI of a4:77:33, a resolution vector may be as follows:

| resolve(a4:77:33) | |
|---|---|
| company | probability |
| google | 0.544809 |
| frontier silicon | 0.141183 |
| samsung | 0.067101 |
| bose | 0.042528 |
| denon | 0.035264 |
| ... | ... |

As shown in the example, an analytic server may determine that the OUI a4:77:33 is a Google OUI, because the probability of the OUI belonging to Google is the highest.

The analytic server may make a bipartite graph between OUIs and words that appear in SSIDs based on the number of distinct MAC addresses from their intersection, take words that appear in the SSIDs from resolved SSID list, and treat the word as resolved if it only appears in the resolved SSIDs of one company.

Figure 5:
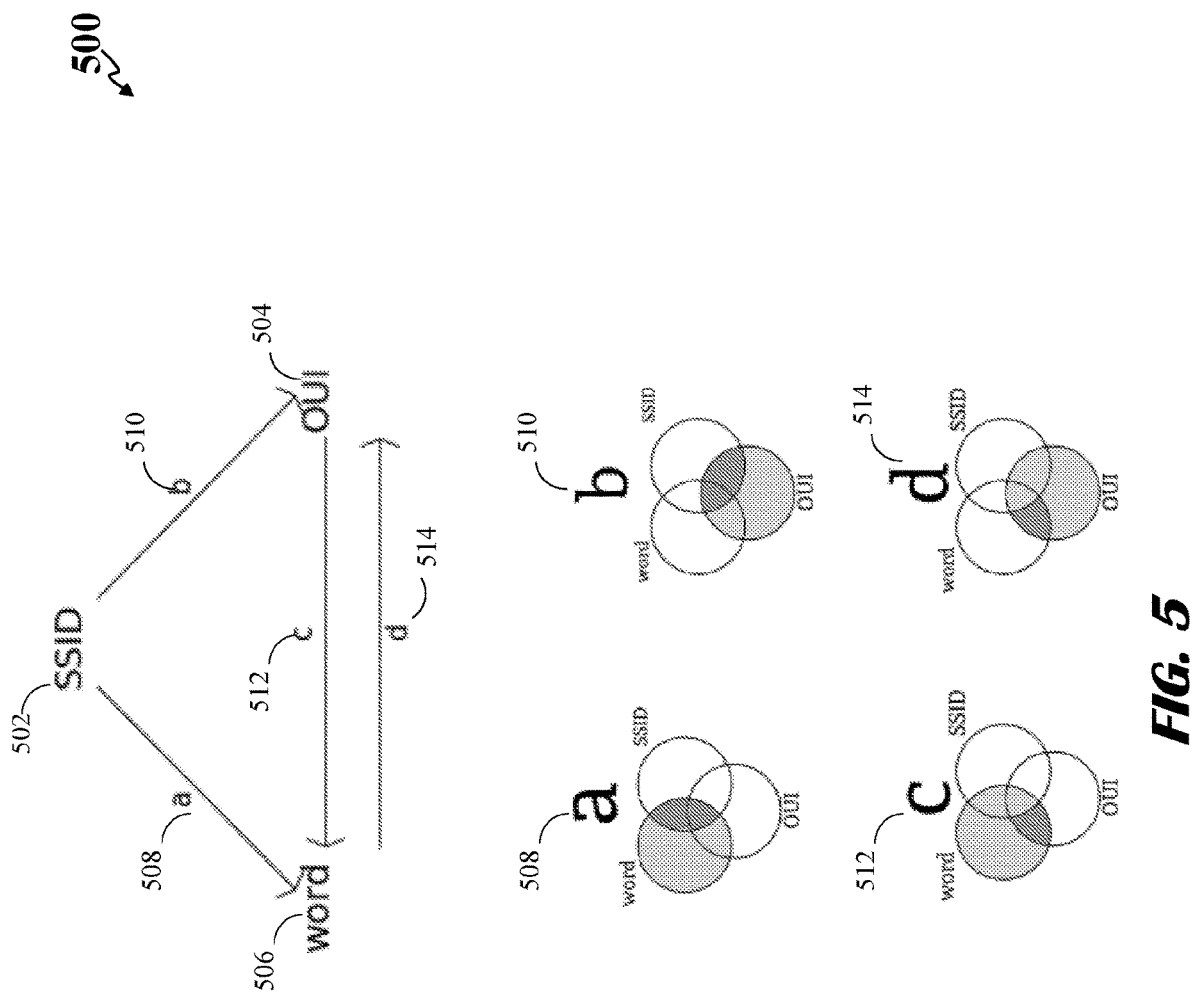
FIG. 5 shows an illustrative resolution process, according to an embodiment.

FIG. 5 illustrates a resolution process of a network 500, according to an embodiment. As shown in the figure, there may be three types of nodes in the network 500: an SSID node 502, an OUI node 504, and a word node 506. In some embodiments, the SSID node 502 may include resolved SSIDS (e.g., paired with a business and/or a manufacturer). The word node 506 may include words that are substrings from SSIDs that have been identified by an analytic server as word-like. The directed edges 508, 510, 512, 514 (also shown as Venn-diagrams) may a measure of influence from a node to the other, based on joint frequencies of the contents of the nodes associated with the nodes.

Directed edge 508 may show the influence of the SSID node 502 to the word node 506. For example, the analytic server may determine that 40% of the time when the word "Series" is identified, it is identified in the SSID "Samsung Series 8." The analytic server may then indicate that the weight of the edge from a SSID node 502 comprising "Samsung Series 8" to a word node 506 comprising a word "Series" may be 0.4. Directed edge 510 may show the influence of the SSID node 502 to the OUI node 506. For example, the analytic server may determine 10% of the time when an OUI is identified; the OUI is paired with a specific SSID. The analytic server may then indicate that the edge weight 510 may be 0.1. Directed edge 512 may indicate a frequency that an SSID paired with an OUI contains a word, when the SSID is not already a resolved node, over the total frequency that the word is identified. Directed edge 514 may indicate a frequency that an SSID paired with an OUI contains a word, when the SSID is not already a resolved node, over the total frequency for the OUI.

The analytic server may associate each of the nodes 502, 504, 506 with a resolution vector. When the analytic server initiates the network 500, all of those vectors may be zero vectors except for the (resolved) SSID nodes, which may be all 0s except for a single one representing a resolution. The analytic server may traverse the network through a series of steps, to calculate vectors for all words and OUIs on the vectors in the previous step.

The analytic server may calculate the resolutions as follows:

$$\text{node resolution vector} = \sum_{\text{incoming edges}} (\text{edge weight}) \cdot (\text{vector of neighboring node})$$

In this way, the resolution from the resolved SSIDs may flow through the network, resolving words and OUIs. Eventually, all nodes may have vectors whose values sum to one.

Embodiments disclosed herein may be utilized for venue corrections and discovery based upon proximal groupings of signals associated with the venues. Venue corrections may be desired when a conventional digital map includes multiple entries of the same venue. Venue corrections may be further desired to identify recent closely businesses or verify manually inputted businesses. Venue discovery may be desired to locate newly established businesses.

Figure 6A:
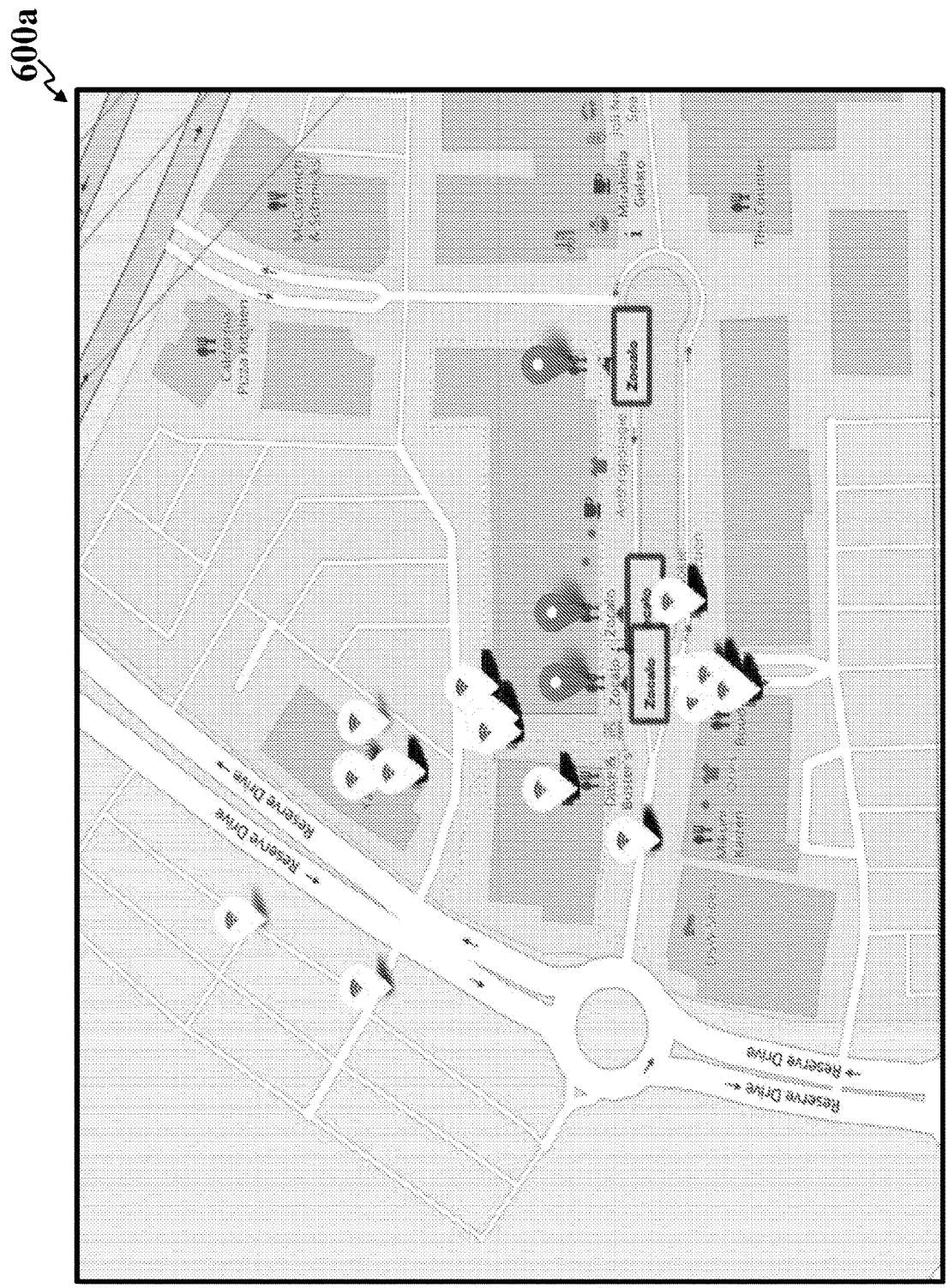
FIGS. 6A-6B show an illustrative application of the signal resolution, according to an embodiment.
Figure 6B:
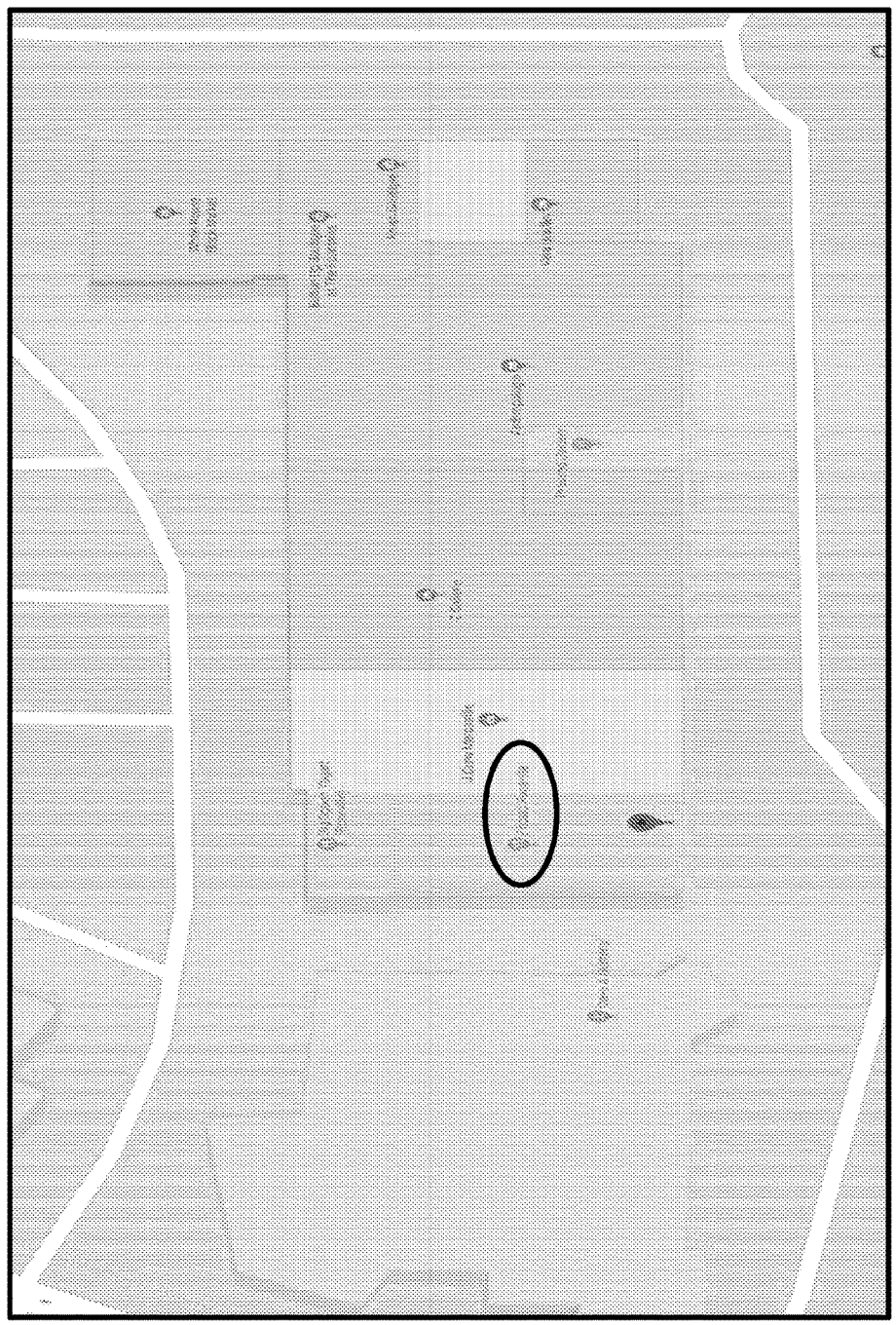

FIG. 6A shows a digital map 600a containing three possible locations for a restaurant named Zocalo. However based on a distribution of signals associated with the restaurant, an analytical server may identify a correct location of the restaurant as shown in an updated digital map 600b in FIG. 6B. The correct location of restaurant is shown in a circle in the updated digital map 600b.

Figure 7:
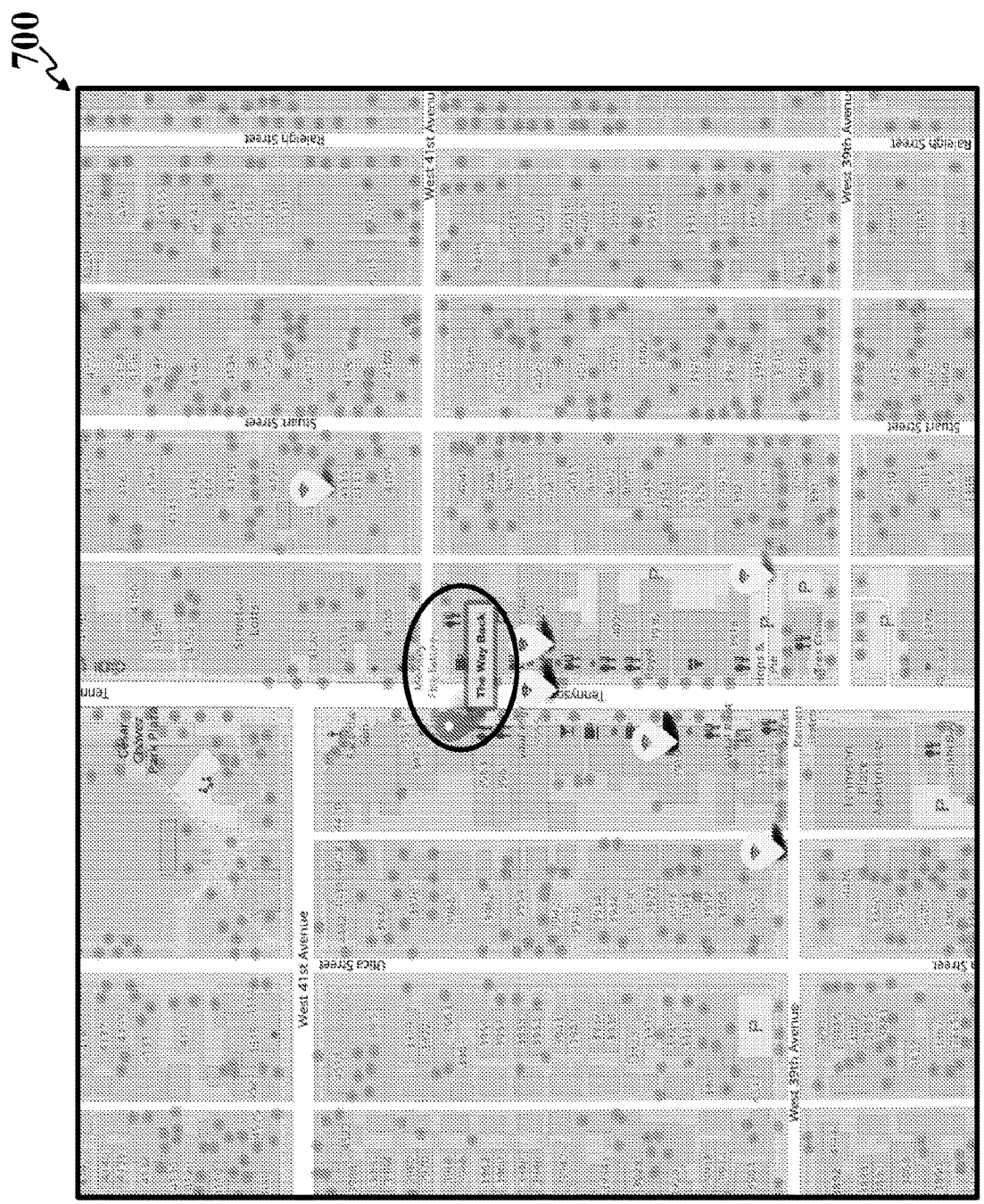
FIG. 7 shows another illustrative application of signal resolution, according to an embodiment.

FIG. 7 shows a digital map 700 of a city. As shown, an analytic server using the embodiments disclosed herein may discover a newly opened restaurant The Way Back based upon observations of the restaurant's WiFi signals such as "thewayback," "Wayback_Guest." The discovered location of the restaurant is shown to be within a circle of the digital map 700.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
in a batch processing mode:
receiving, by a computer, observation data of a plurality of wireless signals observed by a plurality of observer devices;
training, by the computer, a first inductive classifier to generate a first set of deductive rules for syntactic matches between service set identifiers of the plurality of wireless signals and entities associated with the service set identifiers;
applying a multi-dimensional clustering process to generate one or more hyperclusters based on both temporal persistence and spatial proximity of the plurality of wireless signals;
training, by the computer, a second inductive classifier to generate a second set of deductive rules based on the one or more generated hyperclusters, wherein the second inductive classifier is trained to assign a syntactic and/or semantic meaning to a given wireless signal based on a hypercluster of the given wireless signal;
aggregating the first set of deductive rules and the second set of deductive rules to generate an aggregated set of deductive rules for assigning a syntactic and/or semantic meaning to a given wireless signal;
in a real-time deduction mode:
receiving, by the computer, information of an unresolved wireless signal;
generating, by the computer, a semantic resolution of the wireless signal based upon applying one or more rules from the aggregated set of deductive rules; and
displaying, by the computer, the semantic resolution of the wireless signal on a graphical user interface.

2. The computer-implemented method of claim 1, further comprising:
in the batch processing mode:
training, by the computer, a third inductive classifier to generate a third set of deductive rules for syntactic matches between machine access codes of devices generating the plurality of wireless signals and manufacturers of the devices; and
in the real-time deduction mode:
generating, by the computer, the semantic resolution of the wireless signal based upon applying at least one of the first, second, and third set of deductive rules.

3. The computer-implemented method of claim 1, wherein the semantic resolution includes at least one of a manufacturer of a device generating the wireless signal or an entity associated with the wireless signal.

4. The computer-implemented method of claim 3, wherein the semantic resolution includes a probability score indicating a likelihood that the wireless signal is associated with the manufacturer or the entity.

5. The computer-implemented method of claim 3, further comprising:
associating, by the computer, the semantic resolution of the wireless signal with a location.

6. The computer-implemented method of claim 5, further comprising:
displaying, by the computer, the semantic resolution of the wireless signal and the associated location within a digital map on the graphical user interface.

7. The computer-implemented method of claim 1, wherein the training of the first inductive classifier comprises:
removing, by the computer, stop words from the service set identifiers of the plurality of wireless signals;
tokenizing, by the computer, the remaining words from the service set identifiers of the plurality of wireless signals to generate tokenized service set identifiers; and
training, by the computer, the first inductive classifier utilizing the tokenized service set identifiers.

8. The computer-implemented method of claim 7, wherein the training of the first inductive classifier comprises:
identifying, by the computer, a plurality of word-like tokens in the tokenized service set identifiers; and
probabilistically associating, by the computer, one or more words corresponding to one or more word-like tokens to each service set identifier.

9. The computer-implemented method of claim 8, wherein the generating of the semantic resolution of the wireless signal comprises:
identifying, by the computer, at least one of a manufacturer of a device generating the wireless signal or an entity associated with the wireless signal utilizing the probabilistic association of the one or more words to each service set identifier.

10. The computer-implemented method of claim 1, wherein the information of the unresolved wireless signal comprises at least one of service set identifier of the wireless signal or a machine access code of a device generating the wireless signal.

11. A system comprising:
a non-transitory storage medium storing a plurality of computer program instructions; and
a processor electrically coupled to the non-transitory storage medium and configured to execute the plurality of computer program instructions to:
in a batch processing mode:
receive observation data of a plurality of wireless signals observed by a plurality of observer devices;
train a first inductive classifier to generate a first set of deductive rules for syntactic matches between service set identifiers of the plurality of wireless signals and entities associated with the service set identifiers;
apply a multi-dimensional clustering process to generate one or more hyperclusters based on both temporal persistence and spatial proximity of the plurality of wireless signals;
train a second inductive classifier to generate a second set of deductive rules the one or more generated hyperclusters, wherein the second inductive classifier is trained to assign a syntactic and/or semantic meaning to a given wireless signal based on a hypercluster of the given wireless signal;
aggregating the first set of deductive rules and the second set of deductive rules to generate an aggregated set of deductive rules for assigning a syntactic and/or semantic meaning to a given wireless signal;
in a real-time deduction mode:
receive information of an unresolved wireless signal;
generate a semantic resolution of the wireless signal based upon applying one or more rules from the aggregated set of deductive rules; and
display the semantic resolution of the wireless signal on a graphical user interface.

12. The system of claim 11, wherein the processor is configured to further execute the plurality of the computer program instructions to:
in the batch processing mode:
train a third inductive classifier to generate a third set of deductive rules for syntactic matches between machine access codes of devices generating the plurality of wireless signals and manufacturers of the devices; and
in the real-time deduction mode:
generate the semantic resolution of the wireless signal based upon applying at least one of the first, second, and third set of deductive rules.

13. The system of claim 11, wherein the semantic resolution includes at least one of a manufacturer of a device generating the wireless signal or an entity associated with the wireless signal.

14. The system of claim 13, wherein the semantic resolution includes a probability score indicating a likelihood that the wireless signal is associated with the manufacturer or the entity.

15. The system of claim 13, wherein the processor is configured to further execute the plurality of computer program instructions to:
associate the semantic resolution of the wireless signal with a location.

16. The system of claim 15, wherein the processor is configured to further execute the plurality of computer program instructions to:
display the semantic resolution of the wireless signal and the associated location within a digital map on the graphical user interface.

17. The system of claim 11, wherein, to the train of the first inductive classifier, the processor is configured to further execute the computer program instructions to:

remove stop words from the service set identifiers of the plurality of wireless signals;

tokenize the remaining words from the service set identifiers of the plurality of wireless signals to generate tokenized service set identifiers; and train the first inductive classifier utilizing the tokenized service set identifiers.

18. The system of claim 17, wherein, to train the first inductive classifier, the processor is configured to further execute the plurality of computer program instructions to:

identify a plurality of word-like tokens in the tokenized service set identifiers; and probabilistically associate one or more words corresponding to one or more word-like tokens to each service set identifier.

19. The system of claim 18, wherein, to generate the semantic resolution of the wireless signal, the processor is configured to further execute the computer program instructions to:

identify at least one of a manufacturer of a device generating the wireless signal or an entity associated with the wireless signal utilizing the probabilistic association of the one or more words to each service set identifier.

20. The system of claim 11, wherein the information of the unresolved wireless signal comprises at least one of service set identifier of the wireless signal or a machine access code of a device generating the wireless signal.

\* \* \* \* \*